Jan. 6, 1970 G. FREEDMAN 3,487,559
LIGHT ANALOG RADIOTHERAPY PLANNING METHOD AND APPARATUS
Filed Dec. 28, 1967 3 Sheets-Sheet 1
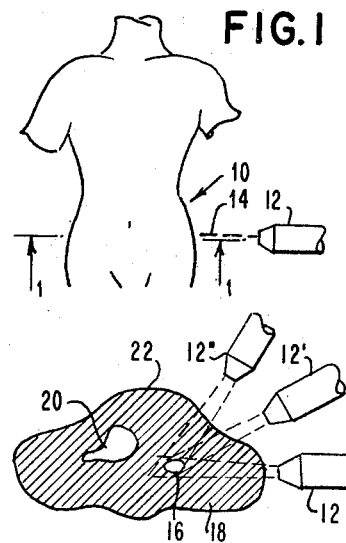
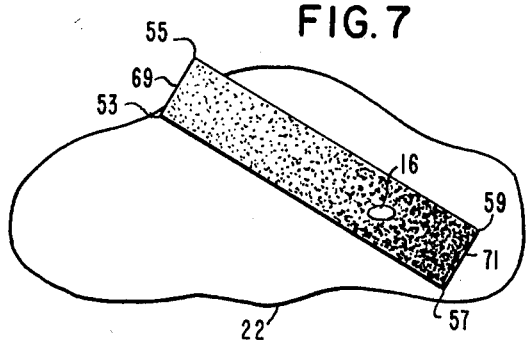
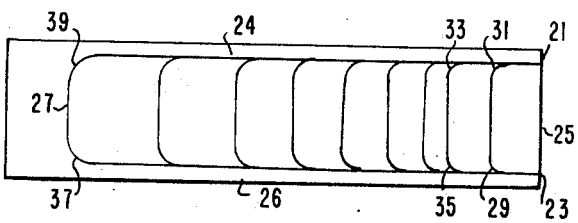
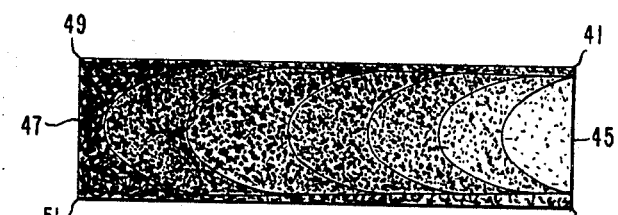
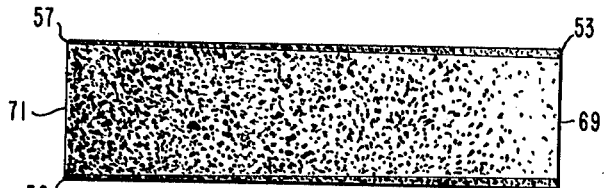
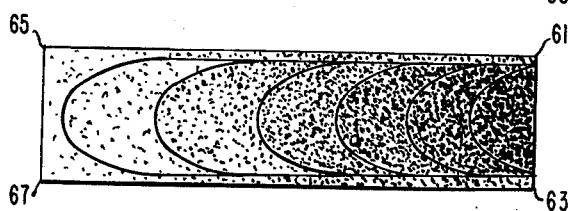
GERALD FREEDMAN M.D.
INVENTOR.
BY Barry Evans
ATTORNEY Jan. 6, 1970  G. FREEDMAN  3,487,559
LIGHT ANALOG RADIOTHERAPY PLANNING METHOD AND APPARATUS
Filed Dec. 28, 1967  3 Sheets-Sheet 2

GERALD FREEDMAN M.D.
INVENTOR.

BY *Barry Evans*

ATTORNEY

Jan. 6, 1970          G. FREEDMAN          3,487,559

LIGHT ANALOG RADIOTHERAPY PLANNING METHOD AND APPARATUS

Filed Dec. 28, 1967          3 Sheets-Sheet 3

GERALD FREEDMAN M.D.
*INVENTOR.*

BY *Barry Evans*

ATTORNEY

3,487,559
LIGHT ANALOG RADIOTHERAPY PLANNING METHOD AND APPARATUS
Gerald Freedman, 315 W. 57th St., New York, N.Y. 10019
Filed Dec. 28, 1967, Ser. No. 694,274
Int. Cl. G09b 23/28
U.S. Cl. 35—17            22 Claims

ABSTRACT OF THE DISCLOSURE

A light transmitting template called an isodose transparency and methods and apparatus for using that template in radiotherapy planning are shown. The transparency of the template decreases along its length analogously to the attenuation of a radiation beam in human body tissue. An image of the template superimposed upon a representation of a plane of body tissue to be irradiated provides visual indication of the zones of higher and lower radiation dosage in the body tissue. The template can be used to plan single or multiple port or rotational mode radiotherapy by exposing a photographic film through a template which is oriented with respect to the photographic film in a manner which simulates a desired radiotherapy plan. The developed photographic negative formed thereby is exposed at any part thereof to an amount of light proportional to the radiation dosage received by the body tissue which it represents. The negative can be analyzed visually or by means of light densitometers or television converters in order to obtain a quick and accurate profile of the areas of higher and lower radiation dosage. A preferred apparatus for simulating a radiotherapy plan includes a light-tight cabinet and a rotatable photographic film. The latter is exposed through an isodose transparency, the orientation of which, with respect to the photographic film, is carefully controlled to simulate the radiotherapy. With the isodose transparencies and the methods and apparatus disclosed herein, it is possible for radiotherapists to quickly evaluate the effectiveness and consequences of a number of radiotherapy plans and produce a picture of the final plan as a permanent record.

---

This invention relates generally to radiotherapy. More specifically, it relates to a new article of manufacture and a method and apparatus for using that article which are useful to the radiotherapist in planning optimal methods for irradiation of body tissue. Even more specifically, the invention relates to a working aid to the radiotherapist which, by means of a unique photometric analog to the irradiation process, permits him to rapidly and accurately simulate and evaluate alternate therapy plans and to choose the therapy plan which will maximize the dosage to the offending tissue, while minimizing radiation dosage to surrounding healthy tissue.

In the treatment of malignancies by irradiation from an external source, the malignancy is bombarded with a collimated beam from a radiation source. The patient is positioned so as to locate the area to be irradiated in the path of the beam and the intensity and duration of the irradiation are determined by the radiotherapist in accordance with the patient's condition, the tissue histology and the extent of the lesion.

Ideally, a lethal dose of radiation is delievered to all parts of the malignancy while exposure of surrounding healthy tissue is minimized. Tissue all along the path of the beam, both in front of and behind an internal malignancy, i.e., toward and away from the source of the beam, is unavoidably subjected to radiation. Since there is an attenuation of the beam as it passes through the body, tissue in front of the malignancy (between the malignancy and the source) receives a greater dosage than tissue behind the malignancy. By using collimators on the radiation source, relatively narrow beams can be produced, but they nevertheless have dimension to them and areas located laterally of the malignancy are bombarded, although to a lesser degree. Furthermore, some body tissues are more radio-sensitive than others and must be more carefully shielded from high radiation dosages to prevent permanent tissue damage. The radiotherapist must consider all these side-effects of the therapy in fixing the orientation of the patient to the beam and the intensity and duration of the irradiation.

Where the patient remains in a single fixed position relative to the radiation source during irradiation, the calculation of tissue dosage is relatively simple. Since beam strength decreases exponentially with penetration into the body and beam dimension is known, the exposure of the malignancy and surrounding areas can be mathematically determined.

A preferred mode of therapy which increases the radiation dosage to the malignancy while minimizing dosage in any one area around the target involves bombarding the malignancy from two, three or more directions. This is known as "multiple port" therapy. Often the optimum way to treat malignancies which require relatively large doses of radiation is to rotate the radiation source about the patient, such that the malignancy is located at the center of rotation of the source. In this technique, known as "rotational mode," the beam enters the body from all points about a chosen body cross section and the malignancy receives maximum dosage due to central summation, while peripheral healthy tissue receives only a fraction of the maximum.

The calculation of tissue radiation dosage, where the patient is treated by rotational mode or multiple port therapy, is difficult, time-consuming, expensive and often inaccurate. It is many times more difficult than the single position calculation. The total dosage at any one point in the irradiated cross section is the sum of dosages received from variously attenuated beams irradiating that point from different directions. Typically, the total dosage at points in the irradiated cross section surrounding the malignancy is calculated by hand, using charts and other crude aids developed from the geometry of the patient's irradiated cross section, the intensity of the beam, and the known attentuation of the beam in the body. The techniques disclosed by Ungar, British Journal of Radiology, volume XVI, No. 189, for example, are useful but tedious. These hand calculations are slow, repetitive and often inaccurate for analysis of rotational mode therapy since they are based on a series of fixed position irradiations rather than the continuous rotation of the source about the patient. More recently, computers have been used to perform these repetitive calculations. The results are obtained more rapidly than by hand calculation but this technique is expensive and requires, among other things, computer personnel and programs for each patient. Moreover, almost all radiotherapy units do not have access to computer time.

It is the primary purpose of this invention to provide a means for evaluating the radiation dosage in body tissue at any point in the path of a radiation beam and to acocmplish this by a simple photometric analog to the absorption of a beam of radiation by human body tissue.

It is a further object of this invention to provide a means for evaluating the radiation dosage to which body tissue is subjected which is simple, quick, accurate and easy to obtain and which permits the resulting radiation dosage plan to be immediately visualized by the radiotherapist.

It is a further object of this invention to provide a means whereby the radiation dosage to which body tissue is subjected during single or multiple port radiotherapy can be evaluated and recorded accurately and quickly.

It is still a further object of this invention to provide a means for recording the radiation dosage profile in tissue subjected to rotational mode therapy and to thereby evaluate alternate radiotherapy plans.

It is still a further object of this invention to provide an apparatus with which rapid, efficient and economical evaluations and recordings of alternative radiotherapy plans can be made.

These and other objects are achieved by means of an isodose transparency having a variable light transparency which is an analog to the attenuation of a beam of radiation in human tissue. The isodose transparency is a light-transmitting template which has a width directly proportional to the width of the radiation beam which it represents and a length which represents the effective depth to which the radiation beam penetrates body tissue. At one end of the transparency, the template transmits a substantial amount of light directed onto it. This end corresponds to the first point of contact of the radiation beam and body tissue and the high light-transmitting characteristic corresponds to the high intensity of the radiation beam where it first contacts body tissue. The transparency of the template decreases along its length from this first point such that the transparency at any point on the template is proportional to the strength of the radiation beam at any point in the body tissue which that point on the template represents. Since radiation beams attenuate exponentially, the preferred template has an exponentially decreasing light transparency.

The isodose transparency provides the radiotherapist with an immediate visual analog to the radiation intensity within a plane of body tissue subjected to a radiation beam and since radiation dosage in the tissue is proportional to the intensity of the beam passing therethrough, the radiotherapist has a visual analog to the dosage at all points in the body tissue along the path of the beam. The isodose transparency can be superimposed on a diagram of a plane of body tissue which is to be subjected to radiation and immediately the radiotherapist can visually evaluate the dosage received by any tissue within that plane and evaluate the radiological consequences of that dosage. More importantly, the isodose transparency can be used to evaluate multiple port or rotational mode therapy by exposing a photographic film through the transparency and summing, by means of photographic exposure, the total radiation dosage to which tissue within the plane is subjected.

An apparatus for using the isodose transparency with photographic film, to create a photometric analog to single, multiple port or rotational mode therapy, has also been developed. Photographic film is exposed by passing light through the isodose transparency while maintaining the transparency at a position with respect to the photographic film which corresponds to the beam of radiation in the body tissue. In one embodiment, the plane of body tissue to be subjected to radiation is reproduced as a cam surface and the isodose transparency is rotated relative to this surface with its axis oriented in the same direction as that of the beam which it represents and its high transparency end maintained in contact with the edge of the cam surface. In a preferred embodiment, a photographic plate is rotated and exposed through an isodose transparency which is moved inwardly and outwardly to trace on the photographic plate the outline of the plane of body tissue to be subjected to radiation. The exposure at any point on the photographic plate is equal to the sum of the light transmitted through the isodose transparency from all directions. The photographic film is then developed by standard techniques and the negative obtained. It shows by areas of relative transparency and opaqueness the areas within the plane of body tissue which are subjected to lesser and greater radiation dosages respectively.

The negative can be analyzed by means of standard light densitometers or other means, such as television color converters, and a radiotherapist can determine immediately the effectiveness and consequences of the particular plan of therapy evaluated. By making films for several cross sections of the patient, or varying the multiple port or rotational mode exposure, the radiotherapist can easily choose that plan which will maximize malignancy radiation dosage and minimize radiation dosage to surrounding areas of healthy tissue.

IN THE DRAWINGS

FIG. 1 is a view of a patient having an internal malignancy located in the plane of body taissue designated by line 1—1;

FIG. 2 is a cross-sectional view of the patient of FIG. 1 taken along lines 1—1 and showing the malignancy located therein;

FIG. 3 is a conventional isodose template;

FIG. 4 is a light isodose transparency according to the present invention, having discrete zones of different light transparency;

FIG. 5 is an isodose transparency wherein the transparency decreases exponentially;

FIG. 6 is an isodose transparency which is the negative of the transparency of FIG. 4;

FIG. 7 is the plane of body tissue shown in FIG. 2, having the isodose transparency of FIG. 5 superimposed thereupon;

Figure 8:
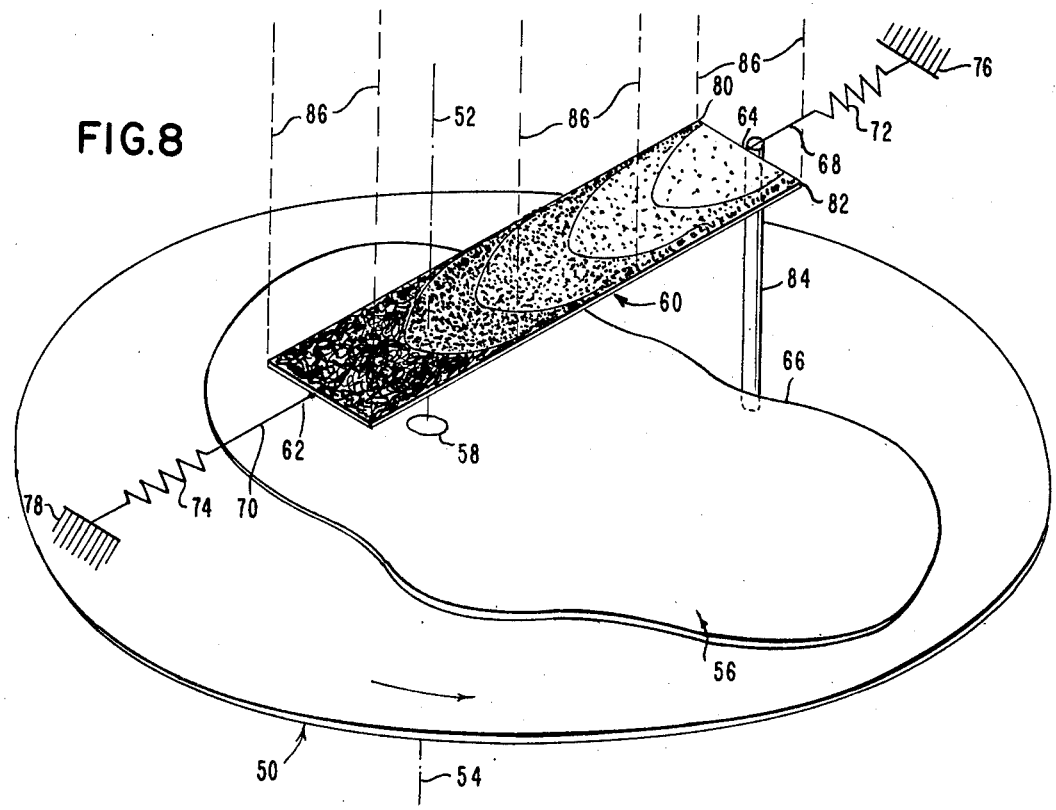
FIG. 8 is a simplified perspective view of an apparatus with which a photographic film can be exposed through an isodose transparency in order to create a photometric analog to and record of single, multiple port or rotational mode therapy.

In FIG. 1 reference numeral 10 refers generally to a patient having an internal malignancy. The malignancy is located at the body cross section designated by lines 1—1, a cross section through the patient's pelvis. The radiotherapy will includes bombardment of the malignancy by beams of radiation emanating from a source of gamma rays 12 which may be a source of high energy particles or radioactive cobalt or other suitable source. The beam of radiation is designated by line 14 emanating from source 12. In practice, the radiation source is several feet from the patient's skin.

In FIG. 2 the cross section of the patient's body through lines 1—1 of FIG. 1 is shown and the radiation source 12 is shown at several alternative positions 12′, 12″ around the body cross section. In practice, a patient is supported in a manner such that the malignancy designated by reference numeral 16 is at the center of rotation of the radiation source 12. A plan or radiation is then formulated which provides maximum dosage at the malignancy while minimizing the dosage to surrounding healthy tissue 18 and avoiding, if at all possible, radiation damage to radiosensitive organs 20. The width of the radiation beam 14 is shown in FIG. 2 and it will be appreciated that the beam likewise has a depth not not shown in FIG. 1.

The healthy tissue 18 between the radiation source 12 or 12' or 12" is subjected to a higher dosage than the malignancy, since the radiation beams are strongest at their first point of contact with the patient's body, designated by outline 22, and are attenuated by absorption of the beam in body tissue. The objective is to irradiate the malignancy from multiple ports around the body cross section or by the rotational mode in such a way as to maximize the dosage at malignancy 16 and minimize dosage to healthy tissue 18 and radio-sensitive tissue 20.

Heretofore, the dosage at any point in the body cross section has been estimated with the aid of isodose curves such as that shown in FIG. 3. The width of the isodose curve between points 21 and 23 is equal to or proportional to the width of a radiation beam. The line 21–23 itself represents the first point of contact of the radiation beam with the human body, the 100 percent isodose, where the beam intensity is equal to the initial strength of the beam at its source corrected for any attenuation between the source and the patient's skin. The line 25–27 represents the centerline or axis of the beam. Each zone from right to left in the isodose curve represents a successively attenuated radiation intensity along the path of the beam and a correspondingly lower radiation dosage to tissue at that point in the plane of body tissue. Thus, zone 21–23–29–31 represents 100 percent radiation intensity; zone 29–31–33–35 represents 95 percent radiation intensity, and so forth. The isodose curve is extended as far as desired, with each successive zone representing the radiation intensity of the beam as it passes through the human body. The isodose curve terminates at line 37–39, which represents a beam intensity or radiation dosage of 30 percent of the radiation intensity at the first point of contact of the beam and the patient, i.e., the intensity at line 21–23. If desired, the isodose curve can be longer and represent as little as 2 percent or 5 percent of the initial radiation intensity, or, if conditions warrant, the isodose curve can be terminated at 70 to 80 percent of the initial radiation intensity. The length of the isodose curve along line 25–27 is designated as the effective depth to which the radiation beam penetrates the body tissue, and this effective depth, as discussed above, may represent a beam intensity of as little as 2 percent of the initial intensity or as much as 80 percent of the initial intensity. Preferably, the effective depth will represent from 30 to 80 percent of the radiation intensity at the beam's first point of contact with the patient. The isodose curve also has edge zones designated by numerals 24 and 26 which represent 10 percent of the initial beam intensity.

The conventional isodose curve shown in FIG. 3 is superimposed upon a representation of the body cross section to be irradiated and the radiotherapist estimates by tracing the zones of higher and lower radiation intensity, the dosage at any point in that cross section. This scheme works well for single port radiotherapy, but where two or three port therapy is desirable the complete analysis becomes tedious and time consuming. For analyzing rotational mode therapy, the conventional isodose curve is unsatisfactory, since at best the rotational mode can be simulated only by assuming radiation enters from a large number of ports. The arithmetic and planning required become extremely time consuming.

A working aid to the radiotherapist far more effective than the isodose curve shown in FIG. 3 is shown in FIG. 4. An isodose transparency, which is basically a light-transmitting template representing the intensity of a beam of radiation passing through body tissue and therefore likewise representing the radiation dosage received by the plane of body tissue in the path of the beam, is shown. The width of the template between points 41 and 43 is proportional to the actual width of the radiation beam being simulated. The axis of the template, line 45–47, represents the central axis of the beam of radiation. The transparency of the template at any point within it is proportional to the intensity of the radiation beam at that point within the plane of body tissue in the path of the beam which the template represents. In FIG. 4 discrete zones of the isodose transparency are shown having a successively lesser transparency from right to left. The amount of light transmitted in each zone differs from adjacent zones by 10 percent of the amount of light transmitted through the first (100 percent) zone. The first zone is the 100 percent isodose which represents the first point of contact of the radiation beam and the patient's skin. For example, in the last discrete zone at the left end of the template, the template transmits only 50 percent of the amount of light which it passes through the first zone on the right side of the template. The length of the template, the effective depth of the radiation beam, can be in the range discussed above for conventional isodose curves; generally the malignant area will be in the range of 40–80 percent. By superimposing this template on a proportionally sized representation of the cross section of body tissue to be irradiated, it is possible to gain an immediate visual picture of the zones of higher and lower radiation intensity in the body.

An isodose transparency which more faithfully represents a beam of radiation in a plane of body tissue is shown in FIG. 5. The transparency of the template from its end 53–55 to its end 57–59 decreases exponentially in accordance with the actual attenuation of radiation in body tissue. The end 57–59 represents the depth of body tissue receiving approximately 30 percent of the radiation intensity at line 53–55, the 100 percent isodose. This isodose transparency is preferable to that described above and shown in FIG. 4 since the light transmitted through the template at any point thereof is exactly proportional to the intensity of radiation at that point in the plane of body tissue which is represented, whereas the template of FIG. 4 rounds off dosage in 10 percent zones and thus has an intrinsic potential error of 5 percent. The isodose transparencies described in FIGS. 4 and 5 may be comprised of materials of varying thickness, or uniform thickness but varying transparency, as desired. A most accurate isodose transparency is comprised of a developed photographic negative having either the discrete areas of transparency or the continuous, exponentially decreasing transparency. A crude but workable isodose transparency can be formed by superimposing layers of translucent material upon one another in order to achieve the desired variation shown in FIG. 4. An isodose transparency of exponentially decreasing transparency such as that shown in FIG. 5 can be made by exposing a negative-forming photographic film, endwise to the actual radiation source, developing the negative and exposing a second negative-forming photographic film through the first in order to reverse the areas of relative transparency and opaqueness.

An isodose transparency of more limited utility is shown in FIG. 6. This transparency has zones of successively greater transparency from right to left, i.e., from line 61–63, the 100 percent isodose, to line 65–67, which represents the smallest usable radiation contribution penetrating the body. Tthe transparency shown in FIG. 6, which is otherwise similar to the transparencies shown in FIGS. 4 and 5, can be superimposed upon a proportionally sized representation of a plane of body tissue to be irradiated and a visual indication of the intensity of the radiation beam at any point in the body tissue along its path can be immediately obtained.

In FIG. 7, the isodose transparency of FIG. 5 is shown superimposed upon an enlarged view of the body cross section of FIG. 2. The isodose transparency and the body cross section are proportionately sized, i.e., if the body cross section is actual size, then the isodose transparency width 53–55 is actual size, and the effective length is equal to the actual effective penetration in the body tissue. Of course it is possible to proportionally enlarge or reduce the representation of the body cross section and the isodose transparency or image thereof as desired.

The isodose transparency or an image projected therefrom is superimposed upon the body cross section with line 53–55, the 100 percent isodose, contiguous with outline 22, which represents the patient's skin. The axis of the transparency or its image, line 69–71, lies with respect to the body cross section, as does the radiation beam which it represents. As shown, the beam travels from skin 22 through malignancy 16.

The isodose transparency may simply be placed upon a representation of a plane of body tissue to be subjected to a radiation beam with the axis thereof registering with the axis of the radiation beam and the end corresponding to the first point of contact of beam and body tissue registering with the point or points on the representation corresponding thereto. This gives the radiotherapist an immediate visual indication of the zones of higher or lower radiation intensity in the patient's tissue. Alternatively, an image projected from an isodose transparency can be superimposed as above-described upon a representation of the plane of body tissue to be irradiated. For example, slide projectors or other projection devices may be used pedagogically to present a visual picture of the radiation profile in a plane of body tissue being subjected to irradiation. It is furthermore possible to impose a plurality of images created by isodose transparencies upon a plane of body tissue and to visually, or by methods to be discussed at greater length below, establish the absorption of radiation at intersections of images by summing the light transmitted through each transparency alone at the areas of intersection. Thus, for example, several images can be simultaneously projected against a representation of a plane of body tissue, thus providing visual analogy to multiple port radiotherapy.

A record of a radiotherapy plan can be obtained by imposing the image of an isodose transparency upon a photographic film which represents the plane of body tissue to be irradiated, the film being exposed thereby at any point to an amount of light proportional to the intensity of the beams passing through that point. If, for example, light is projected through the isodose transparency of FIG. 4 or FIG. 5 and onto a negative-forming photographic film having the shape of the body cross section in FIG. 2 or FIG. 7, the film will be exposed at any part thereof to an amount of light which is proportional to the radiation dosage received by that part of the plane of body tissue. The greater the light density or opaqueness of the developed photographic negative, the higher the radiation dosage, and either visually or with the aid of light densitometers it is possible to establish the radiation dosage at any part of the photographic film, i.e., at any point in the plane of body tissue subjected to radiation. A positive-forming film can also be exposed in similar fashion. In making these exposures, it is necessary only that the axis of the isodose transparency be in registration with the axis of the beam of radiation entering the plane of body tissue and that the 100 percent isodose zone of the transparency be in registration with the part of the photographic film which represents the skin of the patient.

The isodose transparencies of FIGS. 4 and 5 can be used to plan multiple port radiotherapy. A plurality of images created by isodose transparencies in association with a source of light are imposed sequentially upon a proportionally sized photographic film representing a plane of body tissue to be subjected to radiation beams. The axes of the several images are in registration with the axes of the several radiation beams, and the ends of the images corresponding to the first points of contact of the beams and body tissue are in registration with the points on the photographic film corresponding thereto. The film is thereby exposed at any point to an amount of light which is proportional to the absorption of radiation at the corresponding point in the plane of body tissue. Development of the exposed film provides a record of the profile of radiation throughout the plane of body tissue. As discussed above, the photographic film can be negative-forming or positive-forming but the former is preferable since analysis is simplified with light densitometers and the like.

Rotational mode radiotherapy can likewise be planned, analyzed and recorded by a method similar to the one described above. Light is passed through an isodose transparency, such as that shown in FIGS. 4 and 5 (FIG. 5 is preferred), and onto a photographic film which represents the plane of body tissue which will be irradiated during the rotational mode therapy. The end of the isodose transparency which represents the first point of contact of radiation beam and body tissue is maintained in registry with the corresponding points along the perimeter of the photographic film, and the axis of the transparency is maintained in registry with the axes of the radiation beams. The film and isodose transparency are rotated relative to one another at a rate which corresponds to that of the rotation of the source of radiation about the plane of body tissue, and during this relative rotation, the registry of the transparency and photographic film is maintained. The film is then developed and its exposure at any point is proportional to the absorption of radiation by body tissue at that point. The photographic film can be analyzed qualitatively by inspection or quantitatively by means of a light densitometer or color television system.

A simplified apparatus for carrying out the above method is shown in FIG. 8. A negative-forming photographic film is designated by reference numeral 50. It is rotatable about an axis of rotation 52–54 perpendicular to it. Mounted above photographic film 50 and affixed to the same axis of rotation 52–54, is a transparent cam 56 having the shape of a body cross section to be irradiated. Cam 56 corresponds, for example, to the body cross section shown in FIGS. 2 and 7. The axis of rotation 52–54 passes through zone 58 therein, which represents the malignancy in the plane of body tissue. Above cam 56 is isodose transparency 60 which is the same as that described in FIG. 4. The axis 62–64 of isodose transparency 60 is maintained in registration with the axis of a radiation beam passing from perimeter 66 of cam 56 through malignancy 58. Transparency 60 is held in place by rods 68 and 70, springs 72 and 74, and mountings 76 and 78. Isodose transparency 60 is free to move only along its axis 62–64. The end 80–82 of isodose transparency 60 is maintained directly above the perimeter 66 of cam 56 by means of a vertical roller bearing 84 affixed thereto and the latter is spring biased by spring 74 to maintain firm sliding contact with permieter 66 of cam 56. Finally, a light source 86 is provided to direct light downwardly and perpendicularly through isodose transparency 60 and transparent cam 56 and onto negative-forming photographic film 50. Through not shown, all other areas of film 50 are protected from light so that only light passing through transparency 60 will expose the film.

In order to simulate rotational mode radio-therapy, photographic film 50 and cam 58 are rotated about axis 52–54 at a rate which corresponds to the rate at which a source of radiation is rotated about the patient. Isodose transparency 60 rides back and forth along axis 62–64 under the influence of cam 56. End 80–82 of transparency 60 is maintained in registry with the perimeter 66 of cam 56 because of spring biased roller bearing 84. Likewise axis 62–64 of transparency 60 will at all times be in registration with the axes of beams of radiation entering from all directions around the body cross section represented by cam 56, i.e., the axis of the transparency at all times is in registration with radii emanating from the target point for beams of radiation, the malignancy. When photographic film 50 is developed, an image having the shape of cam 56 will be outlined. The darkest areas within that shape will represent those portions of the film exposed to the most light, and those areas by analogy, are those portions of the cross section having the greatest dosage of radiation. The film can, as discussed above, be analyzed by light densitometers.

Although the rudimentary apparatus shown in FIG. 8 provides for the rotation of film and cam with respect to a nonrotatable isodose transparency, it may be understood that the isodose transparency may be rotated relative to a fixed cam and photographic film with equally satisfactory results. This may require somewhat more complicated light shielding and rotational apparatus. Likewise, it is only necessary to maintain the axis of the isodose transparency in registration with radii emanating from the target, and the springs and connections shown in FIG. 8 can be replaced by any means which insures that result. Still further, the system of cam and spring biased roller bearing is not essential. The only crucial relationship which must be maintained is that the end of the isodose transparency which corresponds to the first point of contact of the beam and body tissue be kept at a distance from the target (the malignancy) which corresponds to the actual distance between the malignancy and the patient's skin. Where cam and isodose transparency are proportionally reduced or enlarged with respect to actual size, this distance must similarly be proportionally maintained. Obviously, the cam can be rotated below or above the photographic film and isodose transparency and any suitable means can be used to rotate the cam and photographic film relative to the isodose transparency.

Figure 11:
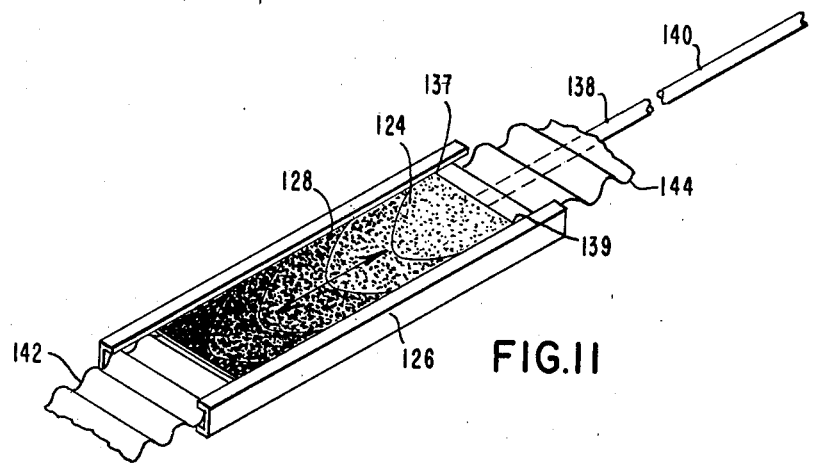
FIG. 11 is a more detailed view of an isodose transparency and its supporting frame used in the apparatus of FIG. 9.
Figure 9:
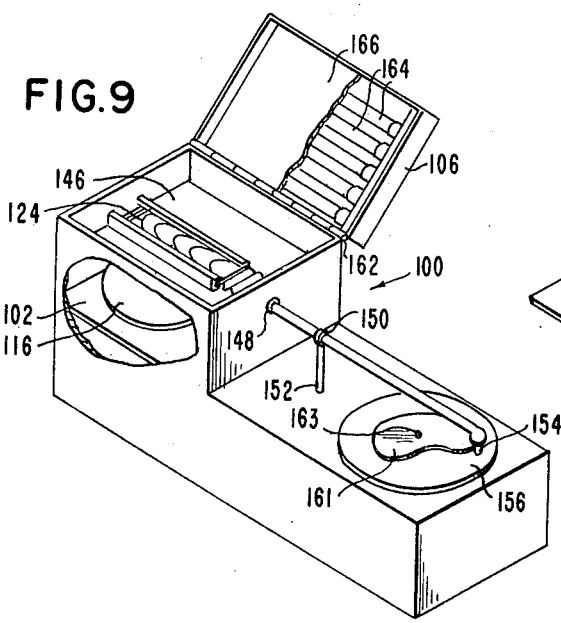
FIG. 9 is a perspective view of the preferred apparatus for using the isodose transparency with photographic film to plan a raidotherapy case.
Figure 10:
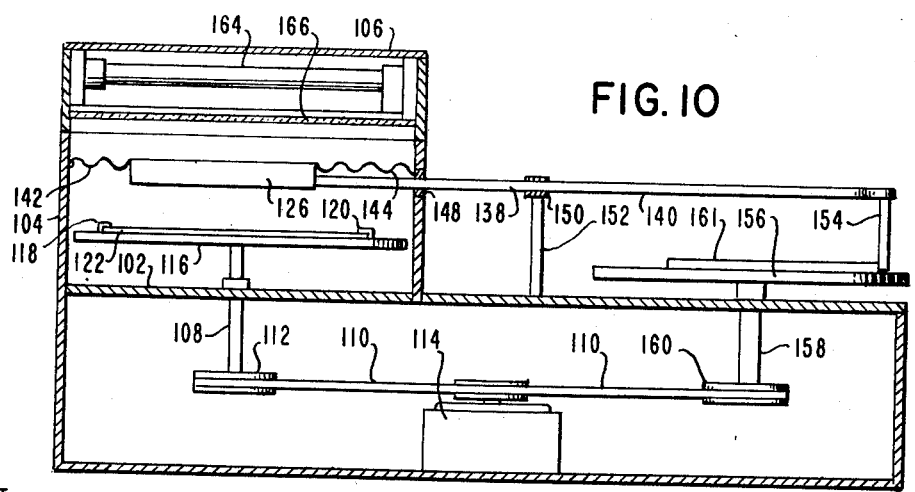
FIG. 10 is a frontal sectional view of the apparatus of FIG. 9.

In FIGS. 9, 10 and 11, a preferred apparatus is shown for planning multiple port or rotational mode radiotherapy using the isodose transparencies and methods described above. Reference numeral 100 refers to a light-tight cabinet having a base 102, walls 104 and a top 106. A rotatable central shaft 108 extends perpendicularly upward through base 102 of the cabinet, and is connected at its lower end by pulley 112 and belt 110 to a variable speed electric motor 114. Located at the top of shaft 108 is a photographic film support platform 116 having guide tracks 118 and 120 thereupon for holding a photographic film. Film is introduced onto support platform 116 through a light-tight rectangular aperture (not shown) in the front wall of cabinet 100. A photographic film is shown at numeral 122, held in place by tracks 118 and 120. Above film 122 is isodose transparency 124, such as that described above in FIG. 4.

Transparency 124 is confined at either side thereof within a frame shown in detail in FIG. 11. The frame is comprised of parallel channel members 126 and 128 which themselves are affixed by means not shown to the walls of cabinet 100. Isodose transparency 124 is connected at its right end to rod 138 and to slave arm 140 which is described in greater detail below. Partially overlying the ends of transparency 124, are expandable-contractable light baffles 142 and 144 which prevent passage of light around the ends and onto the photographic film. The isodose transparency frame is surrounded at all areas to either side of channel members 126 and 128 by a light-tight shield 146 which prevents passage of light into cabinet 100 except through isodose transparency 124. Rod 138 passes through a light-tight fitting 148 in the wall of cabinet 100, continues through sleeve 150 supported on bar support 152 mounted in an extension of base 102 of cabinet 100, and terminates finally in slave arm 140 having vertical stylus member 154. Rod 138 and slave arm 140 are of such length as to locate the center of line 137–139 of transparency 124, i.e., the center of the 100 percent isodose line of the transparency at a distance from the axis of shaft 108 which is exactly equal to the distance between the axis of shaft 158 and stylus member 154. Stylus member 154 lightly contacts a rotatable turntable 156 which is supported from below by shaft 158 and is rotated by pulley 160, belt 110 and electric motor 114. Table 156 thus is rotatable in the same direction and at the same rate as photographic film support platform 116. Located on the surface of turntable 156 is a representation or outline 161 of the plane of body tissue to be irradiated. The malignancy 163 within the plane is positioned above the axis of shaft 158. The outline 161 of the plane of body tissue may be a paper "cut-out" or other similar representation or it may be an actual drawing on the surface of table 156 which reproduces the dimensions of the plane of body tissue.

The top 106 of the light-tight cabinet is provided with hinges 162 to gain access to the cabinet, permitting the radiotherapist to change the isodose transparency in the frame described above. The interior of top 106 is comprised of lights 164 which may be incandescent or fluorescent and a sheet of frosted glass 166 which insures that a uniform light is cast downwardly through transparency 124 onto photographic film 122. Suitable switches and rheostats may also be provided though not shown to vary the intensity and/or the duration of the film exposure through the isodose transparency.

In operation the radiotherapist or technician fixes the "cut-out" of the plane of body tissue to be irradiated on table 156 with the target point therein, the malignancy, in registration with the axis of shaft 158. Stylus 154 is then held in contact with the outer perimeter of "cut-out" 161 and photographic film support platform 116 and turntable 156 are simultaneously rotated by means of the apparatus described at the same rate as that of the radiation source about the patient whose therapy is being planned. During rotation, lights 164 are energized and photographic film 122 is exposed. As table 156 turns, the radiotherapist or technician may hold, or a line sensing device may hold, the stylus in contact with the perimeter of outline 161 in order to maintain the 100 percent isodose of the transparancy being used at a distance from the center of rotation of film 122 which is exactly equal to the distance between stylus member 154 and the center or rotation of table 156.

Figure 12:
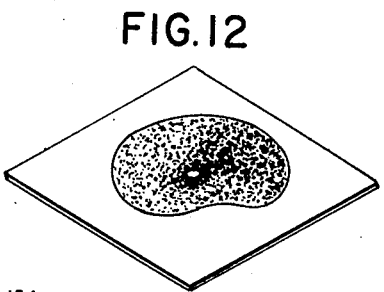
FIG. 12 is an exposed photographic film produced by the apparatus of FIG. 9, showing the photometric analog to and record of a rotational mode radiotherapy plan.
Figure 13:
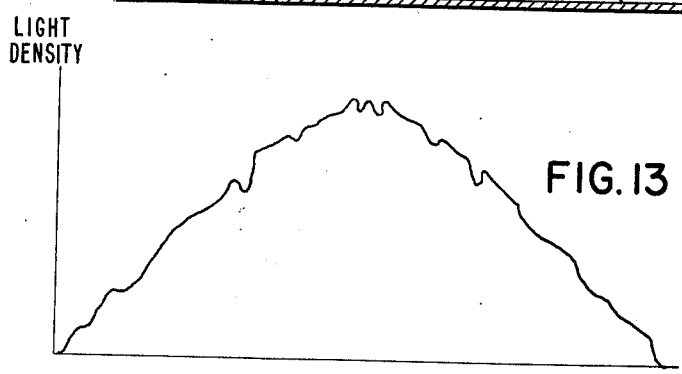
FIG. 13 is a graphical profile of the light density of the exposed photographic film of FIG. 12 across one diameter thereof.

The developed photographic film appears as shown in FIG. 12. The film itself represents the irradiated cross section of the patient's body and the areas of relative darknses in the negative obtained represent areas where the film was exposed to much light and, by analogy, these areas represent tissue subjetced to proportionately greater radiation dosages. The radiotherapist can analyze the negative by a number of known techniques. For example, light densitometers can be used to measure the relative opaqueness of the negative at any point thereof. By correlating opaqueness with known ratiation dosages, it is possible to to immediately establish the dosage profile within the body cross section. In FIG. 13 a curve of radiation dosage is plotted against a diameter of the irradiated body cross section. It can be seen that the radiation dosage is least at the periphery of the cross section and greatest at central areas which are, of course, exposed to beams entering the body from all different directions. Other techniques for analyzing the negatives produced by the methods and apparatus described above include instruments which translate light density into color. These can be used to locate isodose lines within the negative.

The apparatus described above can be used to plan multiple port radiotherapy by exposing the photographic film at two, three or more orientations to simulate the several ports from which radiation beams enter the plane of body tissue. For this purpose, a clutch mechanism and hand rotational means can be provided to simplify the technician's task. Angular indicator means and the like can be used to accurately position the isodose transparency with respect to the photographic film. Isodose transparencies can be easily substituted for one another and/or the intensity of the light generated in the top of the cabinet can be varied in order to achieve maximum accuracy in simulating the radiotherapy with any given photographic film.

What is claimed is:

1. As a new article of manufacture, an isodose transparency comprising: a light-transmitting template useful in radiotherapy planning for creating a photometric analog to the absorption of a beam of radiation by human body tissue, said template representing a plane of body tissue subjected to a radiation beam and having a width directly proportional to the width of said beam, a length between ends thereof directly proportional to the effective depth to which said beam penetrates the body tissue from a first point of contact therewith and a transparency charactristic which decreases along its length from the end thereof representing the first point of contact of said beam and said body tissue to the end thereof representing the effective depth to which said beam penetrates in proportion to the intensity of radiation in the body tissue represented by said point on the template.

2. The isodose transparency of claim 1 wherein the effective depth to which said beam penetrates the body tissue is that depth receiving from 2 to 80 percent of the radiation intensity at the said beam's first point of contact with said tissue.

3. The isodose transparency of claim 1 wherein the transparency decreases along its length in proportion to the exponential decrease of the intensity of the radiation beam as it passes through the said body tissue.

4. The isodose transparency of claim 3 comprised of a developed photographic negative, the transparency thereof along the length of said negative smoothly decreasing according to the exponential decrease of radiation intensity in said body tissue.

5. The isodose transparency of claim 1 wherein there are discrete zones of said template having incremental values of said transparency characteristic along said length.

6. The isodose transparency of claim 5 comprised of shaped and superimposed layers of translucent material arranged to provide the desired transparency characteristic along the length of said isodose transparency.

7. A method of planning radiotherapy by the creation of a photometric analog to the absorption of a beam of radiation by human body tissue wherein: an image created by an isodose transparency as defined in claim 1 in association with a source of light is imposed upon a proportionally sized representation of a plane of body tissue to be subjected to a radiation beam, the axis of said image registering with the axis of the radiation beam and the end of said image corresponding to the first point of contact of beam and body tissue registering with the point on the representation corresponding thereto.

8. The method of claim 7 wherein an isodose transparency is laid upon a representation of a plane of body tissue thereby giving visual indication of the zones of higher and lower radiation intensity in the tissue represented in said plane.

9. The method of claim 7 wherein a plurality of images created by isodose transparencies and representing beams of radiation entering a plane of body tissue from different ports are imposed upon a representation of a plane of body tissue, the absorption of radiation at intersections of the said images created by the said isodose transparencies being proportional to the sum of the light transmitted through each transparency alone at the areas of intersection.

10. The method of claim 7 wherein the image created by the isodose transparency is imposed upon a photographic film representing the plane of body tissue to be subjected to radiation, said film being thereby exposed; and said photographic film is subsequently developed, the exposure at any part of said film being proportional to the absorption of radiation in the plane of body tissue which said film represents.

11. The method of claim 10 wherein said photographic film is negative forming.

12. The method of claim 11 wherein said film is positive forming.

13. A method of planning multiple port radiotherapy by the creation of a photometric analog to the absorption of a plurality of beams of radiation by human body tissue wherein: a plurality of images created by isodose transparencies as defined in claim 1 in association with a source of light are imposed sequentially upon a proportionally sized photographic film representing a plane of body tissue to be subjected to radiation beams, the axes of said images registering with the axes of the said radiation beams and the ends of said images corresponding to the first points of contact of said beams and body tissue registering with the points on the photographic film corresponding thereto, said film thereby being exposed at any point thereof to an amount of light proportional to the absorption of radiation at the corresponding point in the plane of body tissue subjected to radiation; and developing said exposed film to record by its degree of exposure at any point therein the absorption of radiation at the corresponding point in said plane of body tissue.

14. The method of claim 13 wherein said photographic film is negative forming.

15. A method of planning radiotherapy, using the rotational mode by the creation of a photometric analog to the absorption of beams of radiation by a plane of human body tissue, said plane being bounded by a perimeter representing the locus of first points of contact of radiation beams and body tissue, including the steps of: passing light through an isodose transparency, as defined in claim 1, onto a photographic film representing said plane of human body tissue while maintaining the end of said isodose transparency representing the first point of contact of radiation beam and body tissue in registry with the corresponding point on said photographic film and maintaining the axis of said transparency in registry with the axis of said beam; rotating the film and isodose transparency relative to one another to simulate the rotation of the source of radiation about the plane of body tissue to be irradiated while maintaining the registry of transparency and photographic film; and developing said film to obtain a developed film, the exposure of which are at any point is proportional to the absorption of radiation by the body tissue at that point.

16. The method of claim 15 wherein the photographic film is negative-forming and the developed negative is analyzed by means of a light densitometer to determine areas of relatively higher and lower light exposure, by analogy areas of higher and lower radiation absorption respectively.

17. The method of claim 15 wherein a negative-forming photographic film is rotated about an axis perpendicular to it passing through the target point for beams of radiation, the axis of said transparency registering during rotation with radii emanating from said target point and the end of said transparency corresponding to the first point of contact of radiation beam and body tissue registering with the point on said photographic film corresponding thereto.

18. An apparatus for planning radiotherapy comprising: an isodose transparency, as defined in claim 1; a source of light directed perpendicularly therethrough; a photographic film in the path of light passing through said isodose transparency; means to rotate said isodose transparency and said photographic film relative to one another about an axis passing perpendicular to said film through a point corresponding to the target for beams of radiation; means to maintain the axis of said isodose transparency in registration with radii emanating from said target; and means to maintain the end of said isodose transparency corresponding to the first point of contact of said beam and body tissue at a distance from said target proportional to the actual distance between said target and first point of contact of beam and body tissue.

19. An apparatus as recited in claim 18 including: a roller bearing affixed normal to said transparency at the end thereof representing the first point of contact of radiation beam and body tissue; a cam in the shape of the plane of body tissue to be irradiated, rotatable about an axis perpendicular to said cam and intersecting it at the target point for beams of radiation, in sliding contact with said roller bearing; means biasing said roller bearing against said cam; means confining said transparency to reciprocation along a single axis in registry with a radius emanating from the target for beams of radiation; and means for rotating said cam and photographic plate together relative to said isodose transparency.

20. An apparatus as recited in claim 19 including parallel tracks confining the movement of said isodose transparency to reciprocation parallel to the axis of said track and a spring biasing said roller bearing against said cam.

21. An apparatus for planning radiotherapy comprising: a light-tight cabinet having a base, walls and top; a rotatable central shaft extending perpendicularly upward through the base of said cabinet; means for rotating said shaft; a photographic film support platform affixed to the top of said shaft having means for fixedly supporting a photographic film on said support; an isodose transparency as described in claim 1 supported above said film, its axis in registration with a radius emanating from said shaft; means confining said isodose transparency to reciprocation along its axis; means associated with said isodose transparency to maintain the distance between the end of said transparency representing the first point of contact of radiation beam and plane of body tissue at a distance from the axis of the central shaft of said cabinet proportional to the actual distance between radiation target and first point of contact of radiation beam and plane of body tissue; light baffle means on all sides of said isodose transparency to preclude any passage of light onto said film except through said transparency; and a light source above said transparency and below said top to provide light for exposure of said film through said transparency.

22. An apparatus as described in claim 21 wherein the means for maintaining the distance between the end of said transparency representing the first point of contact of radiation beam and plane of body tissue at a distance from the axis of the central shaft of said cabinet proportional to the actual distance between radiation target and first point of contact of radiation beam and plane of body tissue includes: a second shaft and platform rotatable at the same rate as the first; an outline of the plane of body tissue to be irradiated upon said platform, the radiation target lying at the axis of said second shaft; a master arm and stylus for tracing the outline of said plane of body tissue as said first and second platforms are rotated; and a slave arm connected to said master arm and to said isodose transparency to control the travel of said transparency along its axis.

References Cited

UNITED STATES PATENTS

| | | | |
|---|---|---|---|
| 1,973,906 | 9/1934 | Levene et al. | 250—65 X |
| 2,941,312 | 6/1960 | Mattucci | 35—28.3 |

OTHER REFERENCES

Sproul, "X-Rays in Practice," 1st edition, published by McGraw Hill 1946.

EUGENE R. CAPOZIO, Primary Examiner

H. S. SKOGQUIST, Assistant Examiner

U.S. Cl. X.R.

35—28.3; 250—65